(12) United States Patent
Hunt et al.

(10) Patent No.: US 9,476,003 B2
(45) Date of Patent: Oct. 25, 2016

(54) COAL ENHANCEMENT PROCESS

(71) Applicant: Clean Coal Technologies Inc., New York, NY (US)

(72) Inventors: Larry Hunt, Davie, FL (US); Anton Dilo Paul, Venetia, PA (US); Florentino J. Mendez, Oklahoma City, OK (US); Alejandro Garcia, Oklahoma City, OK (US)

(73) Assignee: CLEAN COAL TECHNOLOGIES, INC., New York, NY (US)

( * ) Notice: Subject to any disclaimer, the term of this patent is extended or adjusted under 35 U.S.C. 154(b) by 0 days.

(21) Appl. No.: 14/282,558

(22) Filed: May 20, 2014

(65) Prior Publication Data

US 2014/0250777 A1 Sep. 11, 2014

Related U.S. Application Data

(63) Continuation of application No. 13/940,026, filed on Jul. 11, 2013, now abandoned, which is a continuation of application No. 12/736,535, filed as application No. PCT/US2008/060364 on Apr. 15, 2008, now abandoned.

(51) Int. Cl.
  *C10L 5/00* (2006.01)
  *C10L 5/04* (2006.01)
  *C10L 9/08* (2006.01)

(52) U.S. Cl.
  CPC .. *C10L 5/04* (2013.01); *C10L 9/08* (2013.01); *Y02E 50/10* (2013.01); *Y02E 50/30* (2013.01)

(58) Field of Classification Search
  CPC ............ C10L 5/04; C10L 9/08; Y02E 50/10; Y02E 50/30
  See application file for complete search history.

(56) References Cited

U.S. PATENT DOCUMENTS

| | | | |
|---|---|---|---|
| 4,650,495 A * | 3/1987 | Yan | C10L 9/10 34/337 |
| 5,087,269 A * | 2/1992 | Cha | C10L 9/08 34/370 |
| 5,322,530 A | 6/1994 | Merriam et al. | |
| 6,436,158 B1 | 8/2002 | Fujikawa et al. | |
| 6,447,559 B1 | 9/2002 | Hunt | |
| 7,524,341 B2 | 4/2009 | Iijima et al. | |
| 7,879,117 B2 | 2/2011 | Hunt | 44/621 |

FOREIGN PATENT DOCUMENTS

JP  9-310079A  12/1997

* cited by examiner

*Primary Examiner* — Cephia D Toomer
(74) *Attorney, Agent, or Firm* — Nixon & Vanderhye P.C.

(57) ABSTRACT

Process for producing a clean burning coal from low grade coal, having a higher heating value per unit mass, as compared to the feed stock coal. The clean coal may be used in coal-fired power plants, industrial boilers, and homes since it produces fewer to none of the emissions commonly associated with coal burning devices. The process treats coal prior to its combustion and removes about 90 percent of the pollutants. These pollutants are removed within 6 to 18 minutes, many of which may be recycled into products such as roofing tar, chemical feed stocks, and light hydrocarbons that can be used as gaseous fuels. The product may be used for cooking and heating, and improves the health of persons exposed to toxic fumes from burning uncleaned coal. The process is fueled by its own by-products, recycles heat, and reduces coal weight, thereby saving energy in transportation to the user.

10 Claims, 4 Drawing Sheets

COAL ENHANCEMENT PROCESS

This application is a continuation of application Ser. No. 13/940,026, filed Jul. 11, 2013 (abandoned), which is a continuation of application Ser. No. 12/736,535, filed Jan. 6, 2011 (abandoned), which is a 371 of PCT/US2008/060364, filed Apr. 15, 2008, the entire contents of each of which are hereby incorporated by reference.

BACKGROUND OF THE INVENTION

1. Field of the Invention

The present invention relates to the field of treating biomass to enhance its value or rank. More particularly, the invention concerns a process for the treatment of biomass, especially coal, to efficiently convert the selected feed stock from low rank into a high grade fuel capable of increased heat release per unit of fuel. This is accomplished in part by driving off most on the moisture trapped in low grade coal. The process simultaneously scrubs the coal of pollutants or impurities, many of which are organic volatiles, which are also referred to as by-products.

These by-products are largely combustible and can provide the heat energy required to operate the inventive process after start up in a manner similar to that of a petroleum refinery refining crude oil to produce clean fuels. The removed by-products are recycled into products such as roofing tar, and chemical feed stocks. The organic volatiles are light hydrocarbons that can be used as gaseous fuels, first to power the process after startup, with the remaining organic volatiles being separately processed for other applications. The process further renders the coal into a low smoke generating fuel to make its use more acceptable for domestic purposes such as cooking and home heating. Finally, the inventive process reduces the weight of the coal, which reduces the cost to transport the treated coal to the location where it is burned as fuel.

The process is an energy conservation measure on several different levels. The process increases rank of the coal making it a more effective fuel, removes moisture, uses the by-products removed from the feed stock to power the inventive process, produces treated by-products for other applications such as gaseous fuels that contain more useful energy, and reduces the weight of the coal to reduce energy consumption in transporting the coal to its combustion site. The process also recycles heat to further lower fuel consumption in operating the process The inventive process is principally designed for use with sub-bituminous and lignitic coal, but it is equally applicable to biomass such as wood waste, shells, husks, and other combustible material of organic origin.

2. Description of the Prior Art

Biomass is one of the largest and most readily available energy sources known to man. Biomass is found in immature forms, such as wood, shells, husks and peat. Vast amounts of biomass are also available in the form of lignite, sub-bituminous, bituminous and anthracite coal. Man has been releasing the energy trapped in these materials ever since he discovered and was able to control fire. The inefficient release of these vast energy reserves, however, has resulted in a degradation of the quality of the atmosphere and the environment, and some believe it contributes significantly to global warming. The increasing demand for energy, created by man's insatiable appetite for the products made available by an industrialized society, have created a need to release this energy in a safe, clean and environmentally responsible manner.

It is known to treat coal with the application of heat in a controlled environment to increase its rank. The present invention is actually a significant improvement over Hunt, U.S. Pat. No. 6,447,559. Hunt teaches treating coal in an inert atmosphere to increase its rank. In the present invention, coal is first heated to a temperature of 400° F. in an inert atmosphere to produce coal having only 2-5% moisture, then heated in an inert atmosphere to 1500° F. to produce coal having only 1-2% moisture and a mass reduction of up to 30%, to produce coal having less than 2% moisture and a volatiles content of less than 25%, then cooling the coal in an oxygen-free and dry atmosphere, and finally collecting it.

The prior art preceding Hunt had recognized that heating coal removes moisture and enhances the rank and BTU content of the coal. It was also previously recognized that this pyrolysis activity altered the complex hydrocarbons present in coal to a simpler set of hydrocarbons. This molecular transformation resulted in a more readily combustible coal, but an unstable product. The prior processes took several hours to complete, which made them slow and costly in both capitalization and productions costs. Hunt greatly shortened the processing time of the prior art preceding Hunt.

But Hunt does not recognize either the use of by-products to power the process, or the ability to "farm" a great number of by-products for constructive use outside of the process. Hunt is also a horizontal process, while the present invention is a vertical process that can take advantage at certain points of gravity is moving the coal from one zone to another. Energy conservation is achieved by the present process on multiple levels, and environmental conservation is achieved both in the process facility and by the cleaner burning coal after being processed.

SUMMARY OF THE INVENTION

Bearing in mind the foregoing, a principal object of the present invention is to improve upon prior art coal upgrading processes that utilize heat and pressure to remove moisture and volatile matter from coal by minimizing the creation of unstable products that are prone to moisture re-absorption, size degradation, and spontaneous combustion.

Another principal object of the present invention is to improve the rank of low grade coal by converting it into a high grade fuel capable of increased heat release per unit of fuel and doing so with the by-products of the process such as organic volatiles that are light hydrocarbons that are fuel to power the process after startup.

Another object of the present invention is to improve the rank of low grade coal using a process that is energy conserving on several levels, i.e., the increased rank of the coal makes it a more effective fuel, removes moisture, uses the by-products removed from the feed stock to power the inventive process, produces treated by-products for other applications such as gaseous fuels that contain more useful energy, and reduces the weight of the coal to reduce energy consumption in transporting the coal to its combustion site.

A further object of the invention is to produce a clean burning coal by removing pollutants so that burning the coal minimizes air pollution rendering the coal a more environmentally acceptable fuel.

An additional object of the present invention is to render the coal into a low smoke generating fuel to make its use more acceptable for domestic purposes such as cooking and home heating by removing toxic pollutants.

A further object of the present invention is to reduce the inefficient release of energy reserves in the form of biomass such as coal to, in turn, reduce degradation of the quality of the atmosphere and the environment, and reduce global warming.

Another object of the present invention is to release biomass energy in a safe, clean and environmentally responsible manner.

An additional object of the invention is to provide places in the world like China having ever increasing energy needs with a way to utilize its significant coal deposits in a way that has a positive impact with other nations concerned with air pollution and global warming.

A related object of the invention is to provide nations like China who already use coal for heating and cooking in homes with a way to improve the health of its citizens by minimizing smoke and exposure to pollutants when burning coal in a home.

Other objects and advantages will be apparent to those skilled in the art upon reference to the following descriptions and drawings.

In accordance with a principal aspect of the present invention, a process produces a clean burning fuel from low grade coal. This clean fuel is similar to coal, moisture resistant, stable, and has a higher heating value per unit mass, as compared to the feed stock coal. The clean coal fuel may be handled and combusted like coal in coal-fired power plants, industrial boilers, and homes; however, it produces fewer or none of the emissions of harmful air pollutants that are commonly associated with coal burning devices. The inventive process treats coal prior to its combustion and removes about 90 percent of the pollutants inherent in coal that are responsible for creating smog and unhealthy air.

These pollutants are removed within 6 to 18 minutes, many of which may be recycled into products such as roofing tar, chemical feed stocks, and light hydrocarbons that can be used as gaseous fuels. The final product is optionally formed into briquettes for use in homes where coal is used for cooking and heating. Because of their clean burning characteristics, the use of these briquettes significantly improves the health of those who have previously been exposed to toxic fumes from burning uncleaned coal in their homes.

In accordance with a secondary aspect of the present invention, the process uses a different approach where it uses a multi-stage heating process to gradually heat the coal under controlled residence times and atmospheres to produce a stable product with an increased BTU content—this is a unique and distinguishing aspect of this process over its competitors. The mix of gasses in each zone is proprietary to the inventive process and ensures that the coal loses its volatile matter without combusting itself to produce a clean coal fuel.

The apparatus is comprised of three chambers, each of which is considered a zone. Coal is gradually heated in the first two chambers (zones) and then cooled in the last chamber (zone). Each heating zone may be viewed as a stand-alone partial gasification chamber. Coal is heated under controlled temperatures, residence time, and ambient pressure as it progresses through each zone. Process variables in each zone are adjusted to suit desired end product specifications.

The feed stock coal is crushed to a typical size distribution for utility coal and fed into Zone 1. The temperature and residence time in this zone is sufficient to remove surface moisture from the coal. The coal moves into the second zone where the temperature and retention time are maintained to remove any remaining moisture and low and high boiling volatiles, air toxics (including mercury, arsenic, and some sulfur oxides) are removed. The third zone is a cooling zone where the coal is cooled in a controlled atmosphere. Cooling is conducted at a rate which does not compromise the structural integrity of the coal. After exiting from zone 5, the product coal typically has a moisture content <2% and a volatile content between 5-15%. These two parameters may be varied to suit utility requirements by altering processing conditions.

A gas collection manifold in each chamber captures all moisture and volatile matter released from the coal during processing. A gas separator separates the light hydrocarbons that are directed back to the burners that heat the zones. Heavier gases separated from the lighter gases are collected in a separate vessel for subsequent sale or conversion to synthetic fuels and chemical feed stocks.

The processing plant has been designed to improve the quality of mined coal by approximately 30%, depending on the quality of the incoming coal. This is achieved through the removal of both surface and inherent moisture plus volatile matter from within the coal. This volatile matter contains most of the contaminants and, once removed, leaves the remaining coal to burn cleanly. The process is designed to utilize a minimum amount of energy and time to improve the coal in a safe and consistent manner.

The facility includes a seven day storage capacity of coal in both the raw and finished coal piles. The coal feed stock is delivered to the facility and shipped from the facility by truck or rail. The incoming trucks or rail cars proceed to an unloading station where the contents are dumped into a receiving bunker. Coal from the bunker is conveyed to a stacker where the coal is distributed and packed into a storage pile.

A coal reclaimer harvests coal from the storage pile and conveys it to a conveyor/tripper located above the in-process storage silos. The storage silos store approximately 2.5 hours worth of coal for each processing unit. The conveyor/tripper delivers coal to the silos on a continuous basis. After the coal is processed, it is delivered to the processed coal conveyor at a temperature of 200° F. and conveyed to the finished product stacker where it is compacted and stored in the processed coal pile. From the processed coal pile, the coal is reclaimed and conveyed to rail cars for shipment.

All gasses generated by the different process units are sent to a central gas processing unit where heavy hydrocarbons are separated and condensed into a liquid that is stored and shipped by rail to an oil refinery for further processing. The remaining gasses are separated and four main streams are generated. The first gas stream is carbon dioxide that is recycled back to the coal processing units; the second stream consists of methane and ethane and is sent back to the coal processing units and used as a fuel to heat the coal. The third stream is propane which is condensed and stored as a liquid both for start up of the inventive process and for back up for the fuel gas system. A propane/air mixer produces a fuel gas equivalent BTU mix. The fourth gas stream consists of pentanes and heavier hydrocarbons and is condensed and shipped to a refinery via truck for further processing or sale.

The facility includes coal handling equipment to receive, store and reclaim the coal from a coal feed stock pile for processing. The coal is delivered to in-process storage bunkers located above the processing equipment. From the storage bunkers the coal flows by gravity into the process equipment and is fed into chutes by a series of screw conveyors that deliver a full width layer of coal to the processing equipment. The processing equipment consists of a series of vibratory feeders that convey a 4-inch deep bed of coal through the two heating chambers or zones and the cooling chamber or zone as described above.

In the first heating chamber, the coal is preferably heated from ambient to a temperature of 400° F. or more. The heating occurs under a blanket of carbon dioxide. Hot carbon dioxide is supplied to the first heating chamber through a fluidized bed built into the bed of the vibratory feeder. The carbon dioxide picks up moisture and some hydrocarbon gasses and delivers them to the gas cleaning module for separation of dust and moisture and further processing.

The coal is delivered to the second heating chamber where gas fired heaters heat the coal from 400° F. to 1500° F. or more. Carbon dioxide is fed above the bed of the vibratory feeder. The carbon dioxide picks up additional moisture and a larger amount of hydrocarbon gasses. The gas mixture is delivered to the gas cleaning module for further processing.

The cooling chamber consists of a vibratory feeder moving the coal from one end of the vibratory feeder to the other while being exposed to a stream of cool carbon dioxide that has been fed into the unit. Carbon dioxide is reclaimed from the process at the gas cleaning module.

Carbon dioxide recycled and cooled from the first heating chamber which has been cooled and de-humidified is supplied to this cooling chamber through a fluidized bed built into the bed of the vibratory feeder. The exhaust gasses from the cooling chamber are heated and re-circulated to the first heating chamber, thereby recycling the heat.

BRIEF DESCRIPTION OF THE DRAWINGS

Various other features of the invention will become apparent to those skilled in the art from the following discussion taken in conjunction with the appended drawings in which.

DETAILED DESCRIPTION OF THE PREFERRED EMBODIMENTS

Figure 1:
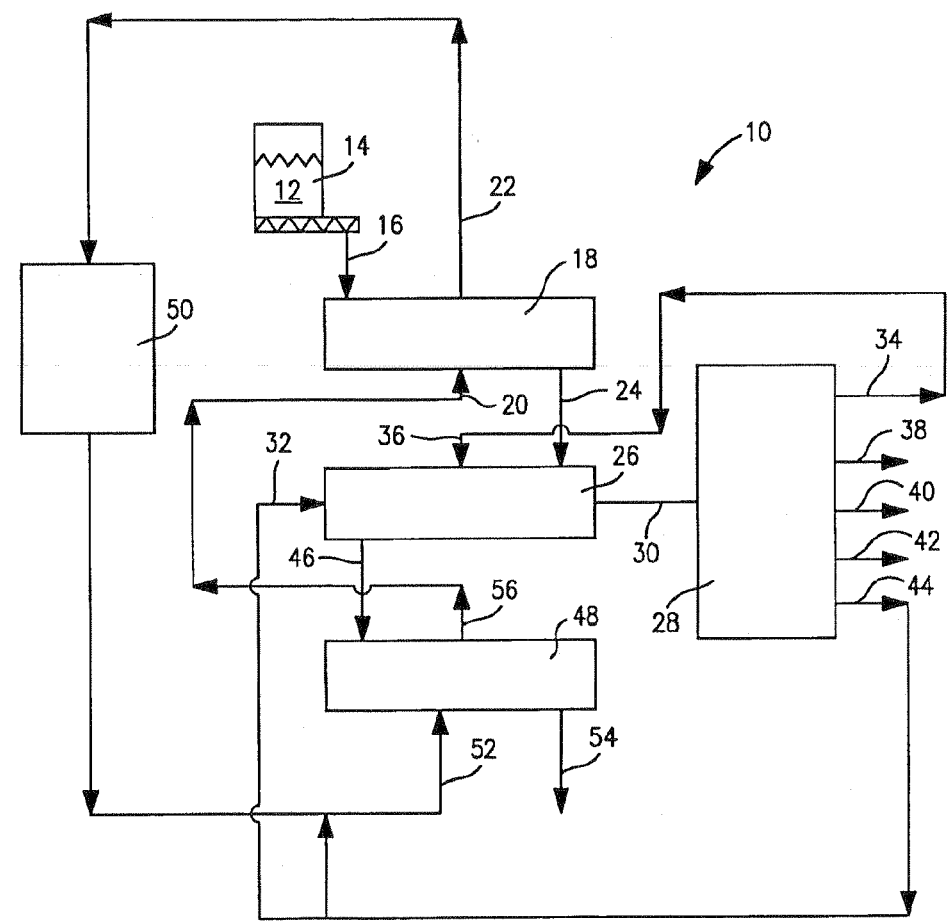
FIG. 1 is the primary schematic diagram of the process showing the product flow. through the facility, partial circulation of carbon dioxide through the process, and the gas separation unit that receives and separates by-products of the process.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims to be appended later and as a representative basis for teaching one skilled in the art to variously employ the present invention in virtually any appropriately detailed structure.

Reference will be made herein to the drawings in which like characteristics and features of the present invention shown in the various figures are designated by the same reference numerals.

The apparatus includes three chambers, each of which is considered a zone. Coal is gradually heated in the first two chambers (zones) and then cooled in the last chamber (zone). Each heating zone may be viewed as a stand-alone partial gasification chamber. Coal is heated under controlled temperatures, residence time, and ambient pressure as it progresses through each zone. Process variables in each zone are adjusted to suit desired end product specifications.

Coal is first crushed and graded using conventional crushing machines, i.e. a Gundlach double roll crusher or a McClanahan type crusher to reduce the feedstock to an average 90% passing 2 inches. It is then screened to remove any—¼" material and transferred via a bucket conveyor to zone 1. Zone 1 contains a vibratory bed that moves the coal along at a controlled rate to match the residence time for this zone. The vibratory bed is heated with hot carbon dioxide that is fed in from the bottom of the bed. The temperature of zone 1 is maintained at around 400° F., which removes most of the surface moisture from the coal.

At the end of the bed, the coal is deposited onto the second vibratory bed (zone 2) via a chute utilizing gravity to save energy. As coal enters zone 2, it is heated by gas fired heaters that maintain the temperature of the zone at about 1500° F. Coal passes through this zone for a few minutes to remove any remaining moisture and any low-boiling volatile matter from the coal. The retention time of the coal in zones 1 and 2 varies depending upon the initial moisture and volatile content of the coal feed and the desired moisture/volatile content of the final product. Typical residence times are on the order of 3-5 minutes per zone.

The coal in the second heating chamber (zone 2), is heated by a series of gas fired heaters to temperatures as high as 1,500° F. The carbon dioxide fed into zone 2 picks up additional moisture and the remaining heavier volatile gases emanating from the coal. This gaseous mixture is eventually delivered to the gas separation section. Between zones 1, 2, and 3, the coal loses the bulk of its volatile matter and undergoes some shrinkage as it losses a portion of its mass. Typically, weight loss is in the range of 15-35% of the coal's initial mass, but weight loss is largely dependent upon the characteristics of the feed coal, zone temperature, residence time, and other factors. These influencing factors are integrated into the overall process control system that monitors these parameters and adjusts them accordingly to obtain the desired final product.

Control of the gaseous mixture inside each zone is critical to the successful operation of the process. When coal is heated to the above mentioned temperatures, its moisture and volatile matter are driven off from the coal macerals. The expansion of the volatile matter at increasing temperature creates fissures and voids within the coal structure. If expansion is too rapid, these fissures can split the coal and the entire coal undergoes size degradation. Other undesirable characteristics are moisture re-absorption and spontaneous combustion after the coal reaches ambient temperature. However, the inventive process monitors the gaseous mix inside each heating zone to control the rate of removal of these volatile elements.

This is accomplished by creating a dynamic phase equilibrium between the solid/liquid and gaseous forms of the volatile matter inside the coal via an inert atmosphere created in part by the volatized materials from the coal and the introduction of an external, non-oxidizing, inert gas such as carbon dioxide or nitrogen. The chambers are provided with entry and exit ports for the admission and retrieval of such gases. The residence time, the type, and individual amounts of gasses circulated within each zone are predetermined for each feed coal and used as control parameters in the process. The oxygen content of the gasses within each zone is typically less than 2% oxygen.

Another effect of the atmosphere provided within each zone is to ensure that the coal maintains most of its natural structural integrity and resists the tendency to disintegrate into fines (particles less than ¼"), even though the coal may be more fragile due to some loss of mass. The processed coal is ready for transfer by a chute using a gravity feed to the cooling zone (zone 3). The gravity feed saves energy.

In zone 3, the coal is cooled by exposing it to a dry inert gas that is free of oxygen. In the process design, the cooling chamber (zone 3) consists of a vibratory feeder moving the coal from one end of the vibratory feeder to the other while being exposed to a stream of cool carbon dioxide that has been reclaimed from the process at the gas separation section. This carbon dioxide is recycled from zone 1 after it had been cooled and de-humidified and supplied to zone 3 through a fluidized bed built into the bed of the vibratory feeder. The exhaust gasses from the cooling section are heated and re-circulated to zone 1. Control systems ensure that the cooling stream of carbon dioxide only contains 0.25 to 0.75% oxygen, by volume, with a moisture content of less than 1% by weight, and flows counter current to direction of flow of the coal.

From zone 3, the coal is now ready for shipment to utility and industrial markets. If needed, fines may be removed from the coal by screening so that the finished product has a size range of ¼" to 2".

The fines are optionally converted into briquettes for home use or used as fuel to supply heat for the process. Alternatively, the fines are sold to a third party for processing into briquettes for home use. The end result is the production of clean burning, low smoke coal briquettes that have strong structural make up, moisture resistant, long shelf life and are cost effective.

What follows is a description of the individual pieces of equipment. The vibratory feeders are, for the most part, standard pieces of equipment designed to move solid products by inducing vibration on a flat bed. Because of the high temperatures involved in the process, the vibrating beds are lined with refractory materials. The vibrating bed is mounted on springs and the vibration is generated by an eccentric arm mounted on a shaft and driven by an electric motor. The electric motor is controlled by a variable frequency drive in order to modulate the speed of the conveyor. The vibratory feeder bed is provided with a metal skirt that is immersed in a sand seal in order to prevent the carbon dioxide atmosphere inside the enclosure from escaping.

The heaters comprise natural gas burners mounted on the walls of the chamber. The fuel/air mixture is controlled to maintain a constant exit temperature. As the amount of combustible gas produced by the process increases within the chamber, the external gas feed to the burner is reduced and combustion air is controlled to sustain combustion and maintain the exit temperature of the gas. Any excess hydrocarbons being generated by the process are carried by the carbon dioxide to the chemical section for processing.

Heat, from external sources, is supplied to the process in three discrete, independent locations. All heat addition locations utilize propane as the start up fuel, produced by the gas plant installed as a part of the process. Propane is stored at the facility.

The first heat addition location is the CO2 fired heater which raises the temperature of the CO2 stream going to first heating chamber. This fired heater raises the CO2 from an inlet temperature of 522° F. to a CO2 discharge temperature of 938° F. A burner utilizing propane/ethane-methane as the burner fuel provides the necessary heat. The burner is equipped with both a vendor furnished Combustion Control System (CCS) and Burner Management System (EMS).

The burner temperature profile and consequently the burner heat release are chosen such that the requisite CO2 temperature rise can be achieved. Given the relatively high CO2 inlet temperature, the flue gas exhaust temperature out of the fired heater is also elevated. A flue gas to combustion air heat exchanger is installed to preheat burner combustion air with the flue gas exiting the fired heater to reduce burner fuel demand. An un-insulated metal stack is installed downstream of the combustion air preheater to discharge the flue gas to ambient.

The second heat addition location is the gas fired heater heating the coal going to the second chamber. This fired heater raises the incoming coal from the first chamber to a coal discharge temperature of 1500° F. Burners fueled with propane/ethane-methane provide the necessary heat. The burners are also equipped with a vendor furnished Combustion Control System (CCS) and BMS. The burner temperature profile and consequently the burner heat release are chosen such that the requisite CO2 temperature rise can be achieved. Given the high flue gas exit temperature, the system includes a flue gas to combustion air heat exchanger to raise incoming combustion air temperature. An un-insulated metal stack is installed downstream of the combustion air preheater to discharge the flue gas to ambient. One of the main advantages of the process is that it recycles 100% of the heat removed from the coal during the cooling process to heat the first heating section of the process.

Centrifugal fans are utilized to move the process gas through the system. The fans are of the radial blade type and, in some cases, are made from specialty metals to handle the high temperatures and corrosive nature of the gasses being conveyed.

The dust collector is utilized to separate any dust from the process gas and water vapor being generated in the first heating chamber. The dust collector is of the bag type and the bags are made of material suitable for temperatures up to 400° F. Normally, compressed air is utilized to shake the bags but in this case carbon dioxide is utilized in order to keep an oxygen starved atmosphere in the process. Because of the hot, humid and corrosive environment, all internal parts in contact with the process stream are made of stainless steel.

The water separator consists of a finned water coil with a large drain pan that condenses the moisture from the process gas stream and drains it. Cooling water for the coil is provided by a condenser water system consisting of cooling towers and circulating pumps.

The cooling towers are the counterflow type and are sized to cool water from 115° F. down to 85° F. at an ambient wet bulb of 78° F. The condenser water system provides cooling to the coal processing as well as the gas processing side of the system. Cooling tower fans utilize electrical reversing relays to reverse rotation on the fans in case of icing during winter.

The condenser water pumps are of the vertical turbine type and are located in a wet well at the cooling tower structure where the water cooled by the towers is collected. The pumps discharge water into a piping system that conveys the water to cooling coils and heat exchangers throughout the facility. The pumps are controlled by variable speed drives to control the amount of water flowing through the system and minimize energy consumption in winter.

Metal chutes conveying coal from one area of the process to another are lined with refractory materials suitable for handling coal as well as the temperatures generated by the process. Vibratory feeders are housed inside refractory enclosures that are under a slight negative pressure generated by the fans exhausting the gasses from the enclosure. The carbon dioxide atmosphere of course prevents the coal from igniting in the presence of oxygen above 400° F.

The gas by-products from the coal heating chambers consist of those materials contained in the combined streams exiting the first and second chambers. These are the volatiles driven from the coal at the various temperature levels and the gas that is being used as a heat transfer medium being used to heat and cool the coal at various stages. The heat transfer gas is carbon dioxide, but nitrogen is also contemplated.

At the low temperature level, i.e. 400° F., volatiles consist primarily of surface moisture. At 1500° F., the volatiles consist of moisture within the coal and light hydrocarbons, hydrogen, carbon dioxide, carbon monoxide, hydrogen sulfide, and ammonia. At the highest temperatures, heavier hydrocarbon, liquids are driven off. Much of the hydrocarbons are deficient in hydrogen, consisting of alkenes and aromatics. In addition to hydrocarbons, the volatiles consist of such contaminant inorganics that are released at higher temperatures, i.e. 2,000° F. Such inorganic contaminants consist of chlorine, mercury, arsenic, etc.

The purpose of the gas module is to remove contaminants and separate various components into saleable and transportable products. These products will be discussed in the products section. Another important purpose is to separate carbon dioxide for recycle back to the coal drying section for its use as a heat medium. Of critical importance to the design of the gas plant is the composition of the volatiles driven from the coal at the various stages of the cleaning process.

The following are the products from the gas plant:

Fuel gas. This consists of C4-material, i.e., methane, ethane, ethylene, butanes, and butylenes. This is used in the coal plant burners as fuel gas. This gas is amine treated, and is relatively free of H2S.

Propane, propylenes. The coal plant requires a source of fuel for startup. For this reason, C3s separation and storage is provided. Excess C3s above that required for the coal plant startup is sold, such as to a refinery as feedstock to a refinery Alkylation unit.

Butanes, butylenes. This is a liquid product stream, and storage facilities are provided. This is optionally used as fuel or as a product to be sold, such as to a refinery as feedstock to a refinery Alkylation unit.

Heavy Liquid, C5 plus liquid. This is described in more detail below.

Sulfur. Described below.

CO2. CO2 is a makeup to the inert gas which is used as a heating medium in the coal cleaning section.

CO. Carbon monoxide is widely used in the chemical industry as the material to produce polyurethane or polycarbonate.

Individual processes are:

Contaminant Removal.

Solid adsorbents remove vapor contaminants such as mercury from gas to very low levels. This is accomplished with two or more adsorbent vessels. As one adsorbent vessel has filled with contaminants, it is brought offline to have the spent adsorbent replaced with fresh adsorbent. Solid contaminants such as arsenic are removed from the liquids thru filtration.

Hydrocarbon Treating.

The removal of H2S from fuel gas is accomplished via amine treating. In this process, H2S is absorbed from the gas in an adsorption column by a specific type of amine. The purified gas is then sent to further processing or used as fuel gas. The H2S absorbed by the amine is then sent to a stripping column were H2S is driven off as a concentrated stream. The lean amine is then recycled back to the absorber. The H2S stripped from the amine is then sent to a sulfur recovery unit.

CO2 Removal.

Removal of CO2 is by $2^{nd}$ stage amine separation. The amine that was used for H2S removal was selective for H2S, leaving CO2 in the gas.

CO Removal.

Carbon monoxide is captured in a process involving absorption/desorption using a solvent containing cuprous aluminum chloride in toluene.

Water Removal.

Water is collected from various locations within the gas plant. These include the adsorbent driers, water boots from the separators. The water is sour, and consequently is treated in a sour water stripper. H2S and ammonia dissolved in the water is stripped and combined with the acid gas from the amine treater, and together sent to sulfur recovery.

The treated gas containing C4 minus material is sent to the light gas separation section. In this section, methane/ethane is first separated using a refrigerated J-T process. This includes an adsorbent dehydrator, propane chiller, cold separator, and de-ethanizer column operating at −30° F. The bottoms product from the de-ethanizer is sent to a depolarizer and debutanizer where propanes/propylenes and butanes/butylenes are separated, respectively. The bottoms product from the debutanizer contain the C5 plus hydrocarbons which combine with the main separator liquid and sent to liquid product storage for subsequent sale.

The heavy liquid (C5 plus material) consists of a wide boiling range material ranging from light naphtha to diesel and heavier. It is hydrogen deficient and highly aromatic. It contains oxygen bearing hydrocarbons such as ethers, aldehydes, esters, and ketones. It is a stabilized material suitable for storage and transportation to a petroleum/petrochemical refinery for further processing. To avoid gum formation, it is stored in a relatively air free environment, that being an insulated, gas blanketed storage tank.

A final by-product is sulfur. It is captured from the H2S that is produced in the sour water stripper and amine units of the gas plant, and processed in a Claus unit to produce elemental sulfur. The Claus unit produces sulfur by reacting H2S over a catalyst with air. The reaction is highly exothermic, resulting in production of high pressure steam generated in a waste heat boiler. This steam is integrated in other sections of gas plant and used for heating. The excess steam could also be used with a turbine to generate electricity.

Sulfur is stored and transported both as a liquid and solid. It is a solid when cooled and formed into briquettes that are more easily transported to facilities for further processing, i.e., fertilizer, sulfuric acid, etc.

Turning finally to the drawing, FIG. 1 is the primary schematic diagram of the process showing the product flow through the facility, partial circulation of carbon dioxide through the process, and the gas separation unit that receives and separates by-products of the process.

The schematic of the process is shown generally at 10. Raw coal 12 that has already been crushed to size and graded elsewhere at the facility (not shown) is loaded into a hopper/feeder 14. It is then fed at 16 to the first zone chamber 18 where it is heated to 400° F. using hot carbon dioxide gas that enters the chamber 18 at 20. This drives off moisture, which is carried out of the chamber 18 by the exiting carbon dioxide at 22.

The 400° F. temperature coal then exits the chamber 18 at 24 and moves to the second zone chamber 26. There is heated to 1500° F. using gas fired burners described in connection with FIG. 3. At this temperature, by-products are driven out of the coal in the form of volatile matter The volatile matter passes to a gas separation unit 28 at 30. It is carried there by carbon dioxide that enters second zone chamber 26 at 32.

In the gas separation unit 28, various by-products are separated from each other and discharged into different streams. The first such stream is methane and ethane at 34. The methane and ethane is recycled at 36 back to second zone chamber 26 where it is burned in gas fired burners to heat the coal to 1500° F. in an oxygen free environment. Thus the first by-product at least partially fuels the inventive process, which was not taught by Hunt, the primary prior art reference. The second stream is propane at 38. At least some of the propane produced by the process is stored at the facility because it is used for heating at startup. Left over amounts can be sold as a by-product of the process. The next stream is heavy carbons at 40 which can be sold to others for chemical feedstocks. The penultimate stream is pentane and heavier hydrocarbons at 42, also saleable to others. The final stream 44 is to separate out the carrier carbon dioxide for recycling back at 32 to second zone chamber 26

The coal heated to 1500° F. in second zone chamber 26 exits that chamber at 46 and passes to third zone chamber 48, where it is cooled in a dry and oxygen free environment. The carbon dioxide that carries moisture out of the first zone chamber 18 at 22 is directed to gas cleaning module 50, where the carbon dioxide is dehumidified. After some other steps described in connection with FIG. 5, the carbon dioxide enters third zone chamber 48 at 52, where it is used to cool the coal down to about 200° F. Then the cleaned coal is discharged at 54 from the process for storage and delivery to users. The carbon dioxide, which is heated by cooling the coal in third zone chamber 48 exits that chamber at 56 and is returned at 20 to the first zone chamber 18 to heat the coal therein to 400° F. as described earlier.

Figure 2:
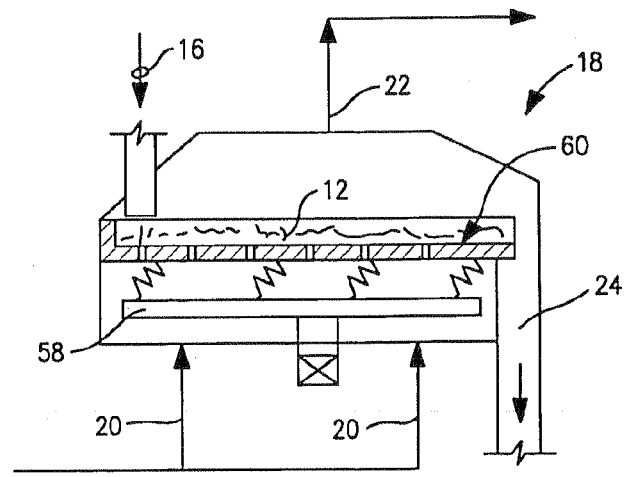
FIG. 2 is a cross sectional view of the first heating chamber or zone.
Figure 3:
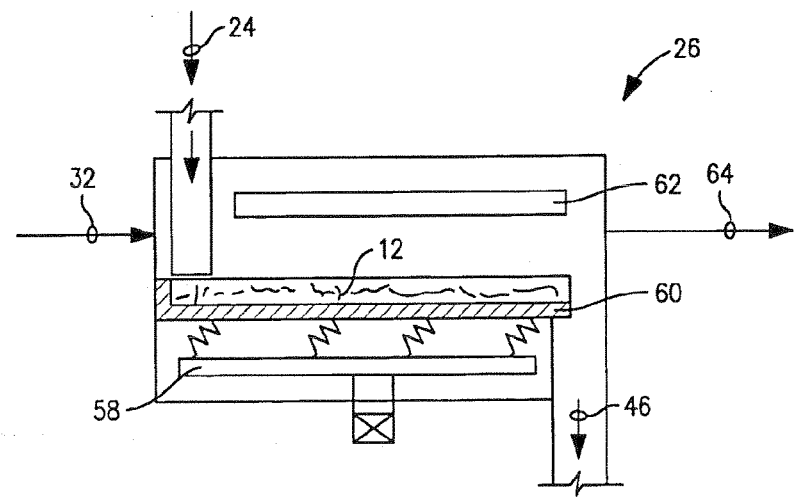
FIG. 3 is a cross sectional view of the second heating chamber or zone.

FIG. 2 is a cross sectional view of the first heating chamber or zone 18. Coal 12 enters the chamber 18 at 16 and is moved on a vibratory feeder 58 which includes a fluidized bed 60. Hot carbon dioxide enters at 20 and is fed into the fluidized bed 60 to heat the coal and absorb the moisture. The dried coal heated to 400° F. then exits first zone chamber 18 at 24 enroute to the second zone chamber 26 as seen in FIG. 3. The carbon dioxide and moisture combination exit at 22 enroute to the gas cleaning module 50 as seen in FIG. 1.

FIG. 3 is a cross sectional view of the second heating chamber or zone 26 into which coal 12 enters at 24 and is moved on vibratory feeder 58 which includes fluidized bed 60. In this chamber, the coal 12 is heated to 1500° F. by gas fired burners 62. Carbon dioxide enters the chamber 26 at 32, picks up by-products given off the coal 12 by the 1500° F. temperature, and leaves zone 26 at 64 enroute to the gas separation unit 28 seen in FIG. 1. The 1500° F. temperature coal leaves zone 26 at 46 enroute to the third zone 48 seen in FIG. 4.

Figure 4:
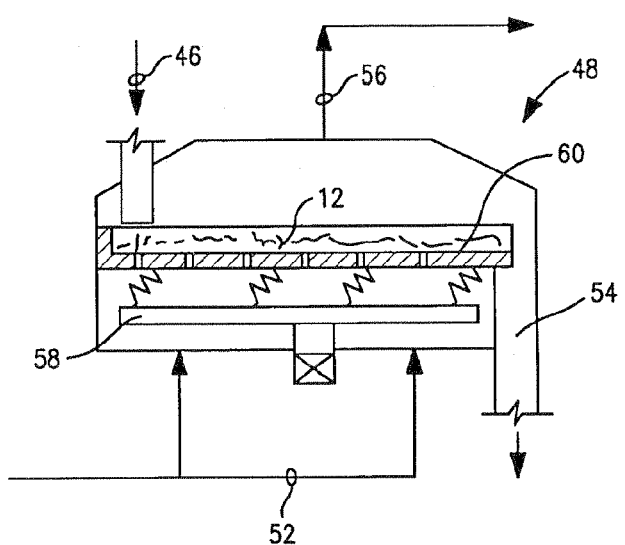
FIG. 4 is a cross sectional view of the cooling chamber or zone.

FIG. 4 is a cross sectional view of the cooling chamber or third zone 48. Coal at a temperature of 1500° F. enters the third zone 48 at 46. Coal 12 is moved on vibratory feeder 58 which includes fluidized bed 60. Carbon dioxide, which has been cooled by the apparatus described in connection with FIG. 5, enters zone 3 at 52. The cooled carbon dioxide is fed to the fluidized bed 60, and cools the coal 12 to 200° F., at which temperature combustion cannot occur when the coal is again exposed to oxygen. The coal 12 then exits the cooling zone 48 at 54 for storage and shipment to users. The carbon dioxide is, of course, heated in the course of cooling the coal, reaching a temperature 522° F. The heated coal exits cooling zone 48 at 56.

Figure 5:
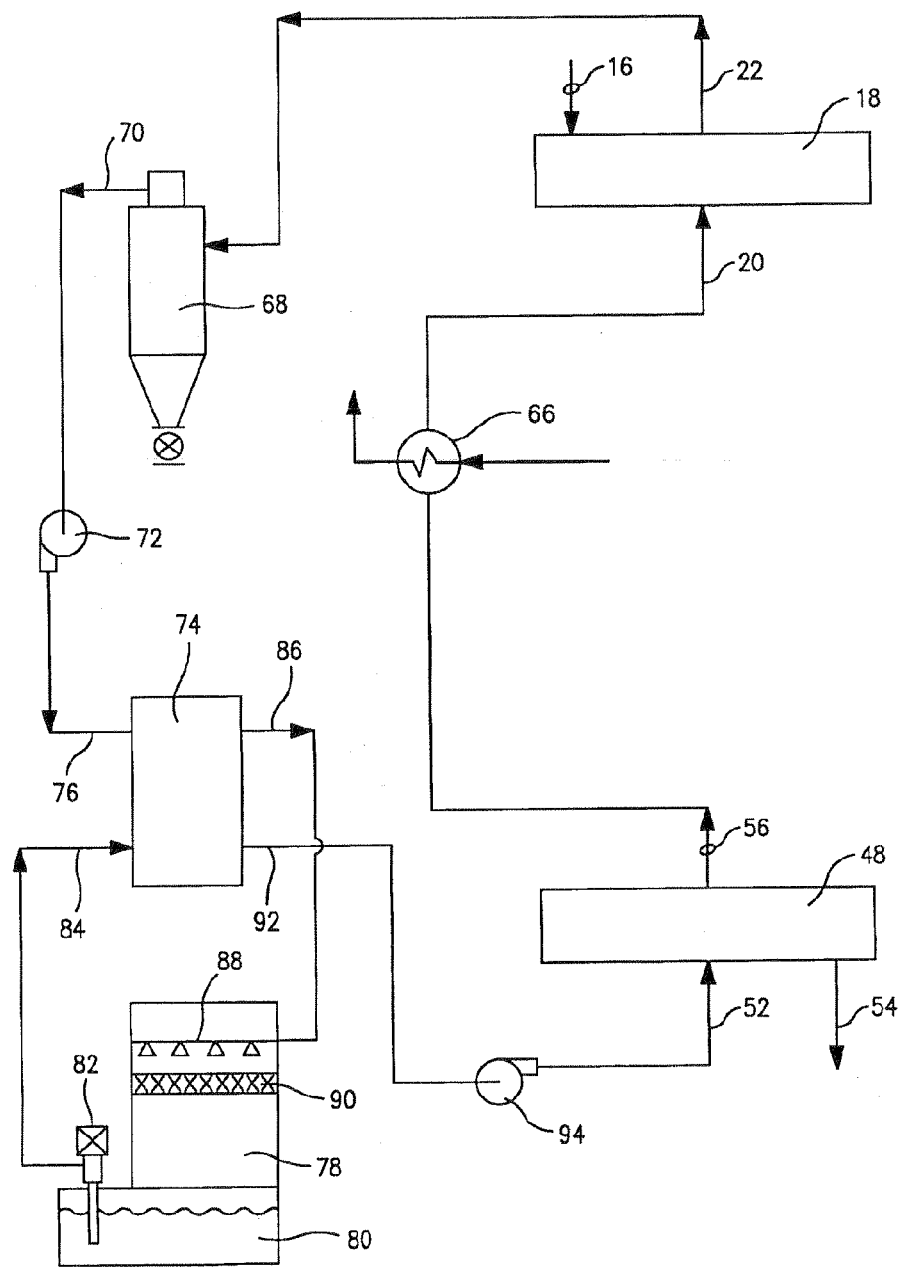
FIG. 5 is the secondary schematic diagram showing the thermal trail of the carbon dioxide through the process facility.

FIG. 5 is the secondary schematic diagram showing the thermal trail of the carbon dioxide through the process facility. The carbon dioxide heated to 522° F. in the cooling zone 48 exits that zone at 56. It is then directed to a CO2 gas fired burner 66 which raises the temperature of the CO2 to 938° F. The gas fired burner 66 utilizes propane/ethane-methane as the burner fuel. The carbon dioxide at a temperature of 938° F. is then directed at 20 to the first zone 18 where it is used to heat incoming raw coal 12 to 400° F. as described earlier in connection with FIG. 2. This results in conservation of energy because a substantial amount of the heat of the process obtained from cooling the coal in the cooling zone 48 is recycled into heating incoming raw coal in the first zone 18.

The carbon dioxide thereafter exits the first zone 18 at 22 and then is sent to a dust collector 68 to be cleansed of dust for later use in the Process. The carbon dioxide leaves the dust collector at 70 using centrifugal fan 72, and is sent to a counterflow heat exchanger 74 which it enters at 76. The heat exchanger 74 is used to cool the carbon dioxide for later use in the cooling zone 48.

The heat exchanger 74 receives cooled water from a cooling tower 78. Cooled water is maintained in a reservoir 80 and is sent to the heat exchanger 74 using pump 82. Cooled water enters the heat exchanger at 84 and leaves it at 86. The water is warmed in the heat exchanger 74 by cooling the carbon dioxide. The warmed water is then directed to the cooling tower 78 where it passes through spray nozzles 88 and film file 90 to be cooled again. It then returns to reservoir 80. The cooled carbon dioxide exits the heat exchanger 74 at 92 and sent using centrifugal fan 94 to the cooling zone 48 which it enters at 52 to cool the coal from 1500° F. to 200° F. as described previously in connection with FIG. 4.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims hereto appended.

What is claimed is:

1. A coal enhancement process comprising:
    heating coal in an oxygen free atmosphere to remove moisture and drive off by-products to increase coal rank; said heating being divided into two zones, the first zones heating to approximately 400° F. to remove surface moisture, and the second zone heating to approximately 1500° F. to remove more moisture and by-products;
    cooling coal in an oxygen free atmosphere in another zone using carbon dioxide;
    recycling the heat removed from the coal to heat incoming coal in the first zone to remove surface moisture;
    collecting the enhanced coal; and
    recycling some of the by-products as fuel to heat the coal and conserve energy.

2. The process of claim 1 which further comprises separating out by-products not recycled and collecting same for productive use elsewhere.

3. The process of claim 1 in which the carbon dioxide is cooled using a cooling tower.

4. The process of claim 1 in which the by products comprise methane and ethane, propane, pentane and hydrocarbons containing at least five carbon atoms, and the process further comprises:
   recycling the methane and ethane from a gas separation unit to a heating zone to use as fuel in heating the coal after start-up of the process; and
   recycling propane produced earlier by the process to use as fuel in starting up the process.

5. The process of claim 2 in which carbon dioxide is used as a carrier to entrain moisture and entrain by-products in the heating phase to carry them to a gas separation unit where it is separated from the by-products, dehumidified in a gas cleaning module, passes through a heat exchanger to be cooled using water from a cooling tower, used in the cooling zone to cool coal where it is heated in so doing, and is recycled back to the heating phase to assist in heating incoming coal again.

6. A coal enhancement process comprising:
   heating coal in an inert oxygen free atmosphere in a first zone to approximately 400° F. to remove surface moisture;
   heating coal in an inert oxygen free atmosphere in a second zone to approximately 1500° F. to drive off more moisture and drive off by-products to increase coal rank;
   cooling coal in an inert oxygen free atmosphere in a third zone;
   collecting the enhanced coal;
   recycling some of the by-products as fuel to heat the coal and conserve energy;
   separating out remaining by-products from the coal and from each other;
   collecting the separated out by products for productive uses elsewhere;
   recycling heat removed from the coal in the third zone to the first zone to heat the coal to 400° F. and conserve energy;
   recycling methane and ethane from a gas separation unit to the second zone to use as fuel in heating the coal to approximately 1500° F. after start-up of the process; and
   recycling propane produced earlier by the process to use as fuel in starting up the process.

7. The process of claim 6 in which the by products comprise methane and ethane, propane, pentane and hydrocarbons containing at least five carbons atoms.

8. The process of claim 6 which further comprises using carbon dioxide as the inert oxygen free atmosphere.

9. The process of claim 8 in which the carbon dioxide is used as a carrier to entrain moisture in the first zone, passes through a dust collector to remove dust picked up in the first zone, is dehumidified in a gas cleaning module, is cycled into the second zone to entrain by-products to carry them to a gas separation unit where it is separated from the by-products, passes through a heat exchanger to be cooled using water from a cooling tower, used in the cooling zone to cool coal where it is heated in so doing, and with supplemental heat added is recycled back to the first zone to heat incoming coal and entrain moisture again.

10. The process of claim 6 in which increasing the rank of the coal is accomplished with a processing time of six to eighteen minutes.

* * * * *